Aug. 17, 1948.  M. E. GLUHAREFF  2,447,118
ROTOR BLADE
Filed Jan. 24, 1945

MICHAEL E. GLUHAREFF
INVENTOR

BY *Gifford S. Holmes*
AGENT

Patented Aug. 17, 1948

2,447,118

UNITED STATES PATENT OFFICE 2,447,118

ROTOR BLADE

Michael E. Gluhareff, Stratford, Conn., assignor to United Aircraft Corporation, East Hartford, Conn., a corporation of Delaware Application January 24, 1945, Serial No. 574,318

2 Claims. (Cl. 170—159)

The present invention relates to rotary wing or propeller structures, and more particularly to a new device for stabilizing such structures under dynamic conditions.

More specifically, my invention pertains to means for arranging the structure of a rotor for helicopters, or the like, so that the dynamic and aerodynamic forces acting thereupon will be compensated under flight conditions. The structure includes a yieldable connection that becomes self-aligning as used in combination with the associated rotor structure. This yieldable connection is incorporated into the folding hinge, in the preferred embodiment disclosed, but it will be clear that the principles of operation are not limited to that particular application.

An object of the present invention is to provide an improved rotor structure including means for automatically compensating and/or resolving one or more forces acting thereon.

Another object is to provide structure as set out in the preceding object wherein material having damping properties is used with the pivots in one or more hinges for the rotor blade.

The foregoing and other objects will be obvious or pointed out in the following specification and claims.

Figure 1:
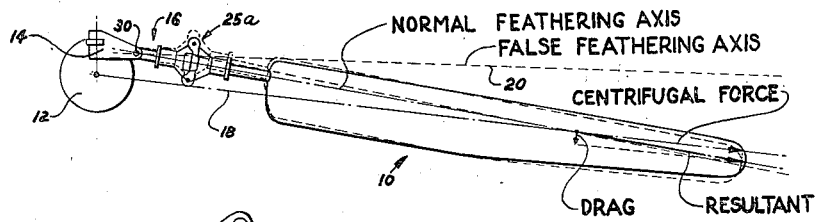
Fig. 1 is a diagrammatic plan view of my invention.

Referring more in detail to the drawing, in Fig. 1 a rotor blade 10 is mounted for rotation with a hub 12 by a universal drag link 14 and a root portion 16. The blade 10 and the root portion 16 are shown in solid lines as being substantially in alignment along the normal feathering axis of the blade 10. With the drag link 14 mounted laterally from the center of rotation of the hub 12, the centrifugal force acting upon the blade 10 will be substantially along the line 18 passing through the center of percussion of the blade 10. The drag of the rotor blade also will act substantially at the center of percussion of the blade 10, and will create a drag component of force. A parallelogram of drag and centrifugal force has been plotted to indicate the resultant action upon the blade. It will be noted that the resultant line is substantially coincident with the normal feathering axis of the rotor blade. Having the resultant force acting in this direction is desirable because the pitch changing mechanism, not shown, is adapted to feather the rotor about such axis. The entire blade will change pitch at the same instant so that whipping will not occur in the blade as it moves in its circular path and cyclically into advancing and retreating air.

A false feathering axis is shown as the line 20 in Fig. 1. Such axis will result from an off-set of the folding hinge to the position shown in dotted lines at 25a (Fig. 1), and to be more fully described hereinafter. When the blade is thus misaligned, so that it is rotated upon cyclic pitch change about the false feathering axis, different parts of the rotor blade 10 will be accelerated and decelerated at different rates and whipping will result. If the two bolts securing the folding hinge 25 are only a very little out of transverse alignment, the tip of the blade will be five to ten times as much out of alignment. This misalignment will cause an error in pitching as the lift of the blade will act at some point back of the false feathering axis and will cause a pitch decreasing moment to be introduced which will unbalance the control system as a whole.

Figure 2:
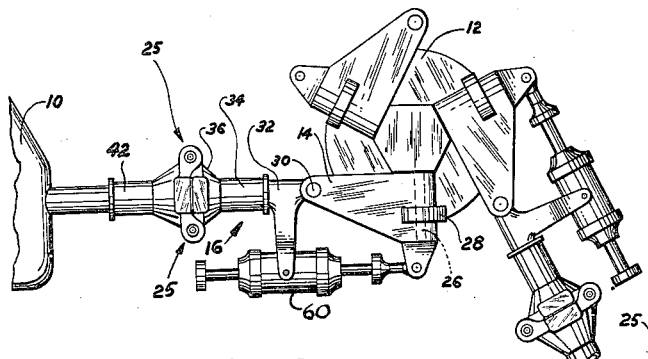
Fig. 2 is a detail plan view of a rotor head including the invention.

In Fig. 2, a more detailed assembly of the rotor is shown. Here the rotor head mounted upon the hub 12 comprises mechanism for driving three rotor blades, only one of which will be explained because they are identical. It will be understood that any number of blades could be used without departing from the spirit of the present invention.

The universal link 14 has a horizontal pivot 26 which pins the link 14 to a lug 28 secured to the rotor head 12. A substantially vertical pin 30 forms the pivot for the root 32 of the blade. A cuff 34 fits upon the root and may be rotatable thereupon for changing the total pitch and the cyclic pitch for the blade 10. The cuff 34 has an expanded end 36 with ears 38 thereon nested within ears 40 which form part of the blade shaft 42.

Figure 3:
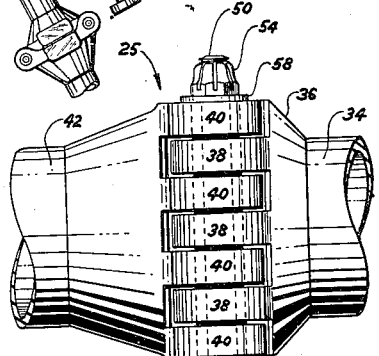
Figs. 3 and 4 are elevation and plan views respectively of a blade folding and locking connection, and, Fig. 5 is an exploded detail view thereof.
Figure 4:
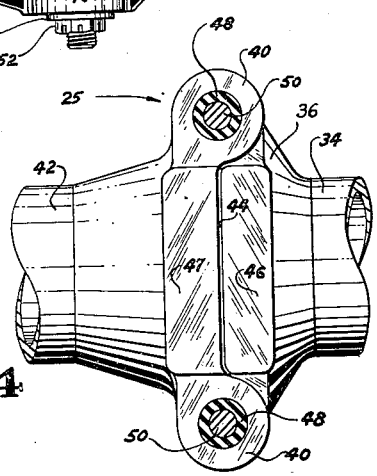

As shown more clearly in Figs. 3 and 4, the ears 38 and 40, assembled, fit together loosely. Also, a space 44 is provided between the facing members 46 and 47 of the parts 34 and 42 respectively. By such relatively loose arrangement of parts there can be small relative movements between the shaft parts 34 and 42.

A resilient bushing 48, which may be of rubber or other plastic material, fits into holes within the ears 38 and 40 and is adapted for ready removal and placement therein. A through-bolt 50 fits the hole running through the bushing 48 and is secured in place by lock nuts 52 and 54. A pair of washers 56 and 58 are larger than the holes in the ears 38 and 40, and are held tightly against the outside ears 40 of the member 42 by the nuts 52 and 54.

Figure 5:
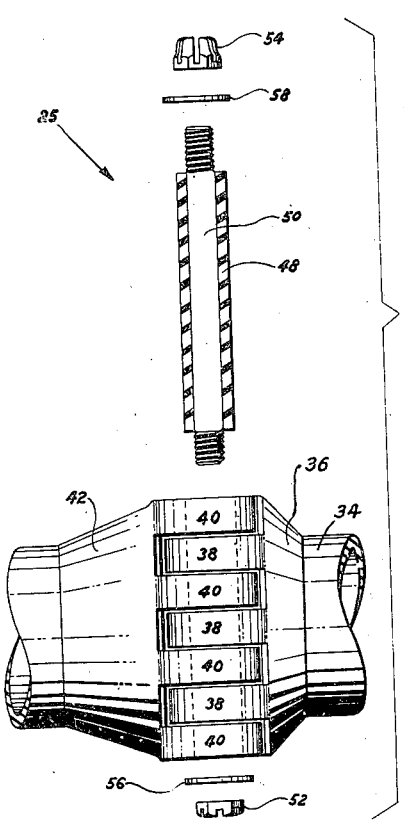

In Fig. 5, the members 34 and 42 are shown in nested relationship and the holes therethrough are indicated in dotted lines. The bushing 48 is shown as mounted upon the through-bolt 50 to which it may be bonded, if desired. The lock nuts 52 and 54, and the washers 56 and 58 are shown as moved away from the parts with which they mate.

When a helicopter or the like provided with my invention is to be placed in a hangar, one of the bolts 50 together with its bushing 48 is removed from the folding hinge 25 and the entire rotor blade 10 is rotated about the other bolt 50 and back adjacent a side of the fuselage of the craft. For this reason it is preferred that the resilient bushing 48 be relatively readily removable from the holes within the members 38 and 40 to facilitate disassembly.

When a craft containing the structure disclosed above is in flight, the centrifugal forces and drag forces acting upon the rotor blades will cause a resultant force to be exerted upon the blade as discussed hereinbefore. With the resilient structure described above, these forces will cause one or the other of the bushings 48 to be compressed on one side or the other, and the blade 10 to rotate about and compress the other of the bushings so that the feathering axis for the blade 10 will be substantially in alignment with the root 16 and the drag link 14. This compression action will squeeze the material 48 around the pin 50 with respect to the ears 40 in a first sense, and in the opposite sense around the ears 38. The intermediate portions of the material will therefore be placed in shear. Thus, for any change in conditions affecting the rotor blade, my structure will also provide that type of damping using rubber in shear.

A further advantage of the present structure resides in the provision of the material 48 having the attribute of damping rapid vibrations, with a damper 60 which is of the hydraulic type for damping relatively slower vibrations. Thus, the high frequency oscillations, that may cause fatigue of structural parts, can be absorbed by the rubber 48, and the possibility of failure of parts will be reduced. The damper 60 may absorb large amplitude, low frequency vibrations relatively independently of the usually transient rapid vibrations.

With the nested ears shown in Fig. 5, there are spaces between the flat faces thereof. With such an arrangement, it is possible for the parts 34 and 42 also to be displaced relative to each other in a direction tilting companion flat faces with respect to each other. This action, likewise, will place different sections of the bushing member 48 in shear.

While I have shown and described my device in connection with a rotor blade assembly, it will be clear that other modifications and uses thereof will occur to those skilled in the art. For this reason I wish not to be limited in my invention only to that form shown and described but by the scope of the following claims.

I claim:

1. In a rotary wing aircraft, a rotor hub, a universal link having a generally horizontal flapping pivot connecting it with said hub, a shaft constituting a blade root having a generally vertical pivotal connection with said link, a blade shaft adapted to be aligned with said root and carrying a rotor blade, a blade folding and locking connection between said blade and root shafts having resiliently connected mating parts, each of said mating parts comprising two sets of duplicate ears carried by said blade and root shafts respectively and disposed on opposite sides of the axis of said blade shaft, each set of ears on said blade shaft comprising a plurality of spaced ears adapted to intermesh with a plurality of similarly spaced ears on said root shaft, said intermeshing ears of each set being provided with registering holes, resilient bushings in said holes, hinge pins extending through said bushings, said pins and bushings completely filling said holes, and means for holding said pins and bushings in assembled relation in said ears.

2. In a rotary wing aircraft, a rotor hub, a universal link having a generally horizontal flapping pivot connecting it with said hub, a blade having a spar, a blade root shaft mounted on said link for pivotal movement about a drag pivot, means for mounting said blade on said root shaft for pitch changing movement comprising a blade cuff rotatable on said shaft, and blade folding and locking hinge means connecting said spar and cuff in substantially aligned position including duplicate sets of spaced parallel ears carried by said spar and mating sets carried by said cuff, the ears of each set having aligned passages therein and being disposed on opposite sides of the axis of said spar and shaft in planes generally parallel with the plane of rotation of said blade, resilient bushings extending through the registering passages in mating sets of said ears, hinge pins extending through said bushings, said pins and bushings completely filling said passages, and means for holding said pins and bushings in assembled relation in said ears.

MICHAEL E. GLUHAREFF.

REFERENCES CITED

The following references are of record in the file of this patent:

UNITED STATES PATENTS

| Number | Name | Date |
|---|---|---|
| 645,354 | Emrich | Mar. 13, 1900 |
| 1,948,457 | Larsen | Feb. 20, 1934 |
| 1,989,544 | Campbell | Jan. 29, 1935 |
| 2,023,840 | Kay et al. | Dec. 10, 1935 |
| 2,311,247 | Pitcairn | Feb. 16, 1943 |

FOREIGN PATENTS

| Number | Country | Date |
|---|---|---|
| 437,521 | Great Britain | Oct. 28, 1935 |